(12) United States Patent  (10) Patent No.: US 7,848,069 B2
Ootsuka et al.  (45) Date of Patent: Dec. 7, 2010

(54) PROTECTIVE CIRCUIT

(75) Inventors: Hiroyuki Ootsuka, Hyogo (JP);
Hideaki Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 12/125,151

(22) Filed: May 22, 2008

(65) Prior Publication Data
US 2009/0195947 A1 Aug. 6, 2009

(30) Foreign Application Priority Data
Feb. 4, 2008  (JP) ................ 2008-023884

(51) Int. Cl.
H02H 9/00 (2006.01)
(52) U.S. Cl. .................. 361/56; 361/91.1; 361/111
(58) Field of Classification Search .............. 361/56, 361/91.1, 111
See application file for complete search history.

(56) References Cited

U.S. PATENT DOCUMENTS

| 5,467,049 A | 11/1995 | Kida et al. | |
|---|---|---|---|
| 5,536,958 A * | 7/1996 | Shen et al. | 257/356 |
| 5,661,322 A * | 8/1997 | Williams et al. | 257/331 |
| 6,876,529 B2 * | 4/2005 | Li | 361/56 |
| 2001/0022525 A1 * | 9/2001 | Grimaldi et al. | 327/384 |
| 2004/0095699 A1 * | 5/2004 | Kohno | 361/100 |
| 2008/0062595 A1 * | 3/2008 | Ping et al. | 361/56 |

FOREIGN PATENT DOCUMENTS

| JP | 58-58827 A | 4/1983 |
|---|---|---|
| JP | 64-55017 A | 3/1989 |
| JP | 5-36979 A | 2/1993 |
| JP | 6-104712 A | 4/1994 |
| JP | 10-164748 A | 6/1998 |
| JP | 10-274663 A | 10/1998 |

* cited by examiner

*Primary Examiner*—Jared J Fureman
*Assistant Examiner*—Terrence R Willoughby
(74) *Attorney, Agent, or Firm*—Leydig, Voit & Mayer, Ltd.

(57) ABSTRACT

A protective circuit connected between a terminal of a semiconductor integrated circuit and ground (GND), comprises: a first diode having an anode connected to the terminal of the semiconductor integrated circuit; a second diode having an anode connected to GND and a cathode connected to the cathode of the first diode; a transistor having a collector or drain connected to the terminal of the semiconductor integrated circuit, and an emitter or source connected to GND; and at least one third diode connected in series in a forward direction from the cathode of the first diode toward the base or gate of the transistor.

6 Claims, 3 Drawing Sheets

PROTECTIVE CIRCUIT

BACKGROUND OF THE INVENTION

1. Field of the Invention

The present invention relates to a protective circuit for protecting a semiconductor integrated circuit from electrostatic discharge, and more specifically to a protective circuit that can reduce a mounting area by decreasing the number of elements.

2. Background Art

A protective circuit is used for protecting semiconductor integrated circuits from electrostatic discharge (ESD) (for example, refer to Patent Documents 1 to 6). The protective circuit is connected between a power source terminal or input-output terminal of the semiconductor integrated circuit and GND. The protective circuit is composed of, for example, a plurality of stages of diodes connected in series so as not to operate at a certain voltage or below. In the protective circuit for the power source terminal, the number of stages of diodes is determined so as not to operate at a power-source voltage or below. On the other hand, in the protective circuit for the input-output terminal, the number of stages of diodes is determined so as not operate at the voltage amplitude of normal input-output power.

[Patent Document 1] Japanese Patent Laid-Open No. 6-104712

[Patent Document 2] Japanese Patent Laid-Open No. 10-274663

[Patent Document 3] Japanese Patent Laid-Open No. 10-164748

[Patent Document 4] Japanese Patent Laid-Open No. 58-58827

[Patent Document 5] Japanese Patent Laid-Open No. 5-36979

[Patent Document 6] Japanese Patent Laid-Open No. 64-55017

SUMMARY OF THE INVENTION

FIG. 6 is a circuit diagram showing a protective circuit, according to the first reference example. Five stages of diodes D61 to D65 are connected in series in a forward direction, and five stages of diodes D66 to D70 are connected in series in a backward direction from the terminal T of a semiconductor integrated circuit to GND. Thereby, the semiconductor integrated circuit can be protected from positive and negative surge signals. The number of elements composing the circuit of FIG. 6 is ten. However, if the circuit is composed of n-stage diodes, (n×2) diodes are required.

FIG. 7 is a circuit diagram showing a protective circuit, according to the second reference example. The anode of the diode D71 is connected to the terminal T. The anode of the diode D72 is connected to GND, and the cathode of the diode D72 is connected to the cathode of the diode D71. The cathode of the diode D73 is connected to the terminal T. The cathode of the diode D74 is connected to GND, and the anode of the diode D74 is connected to the anode of the diode D73. From the cathodes of diodes D71 and D72 toward the anodes of diodes D73 and D74, diodes D75 to D77 are connected in series in a forward direction. As described, since the circuit shown in FIG. 7 uses diodes D75 to D77 in both forward and backward directions, the number of elements can be reduced compared with the circuit shown in FIG. 6.

It is required that the diodes in the protective circuit have a sufficiently large area for p-n junction so as not to be damaged by surge current. Therefore, if the number of stages of diodes is large, there is possibility that the mounting area of the protective circuit that occupies on a chip is widened.

To solve the above-described problems, it is an object of the present invention to provide a protective circuit that can reduce a mounting area by decreasing the number of elements.

According to one aspect of the present invention, a protective circuit connected between a terminal of a semiconductor integrated circuit and GND, comprises: a first diode whose anode is connected to the terminal of a semiconductor integrated circuit; a second diode whose anode is connected to GND and whose cathode is connected to the cathode of said first diode; a transistor whose collector or drain is connected to the terminal of said semiconductor integrated circuit, and whose emitter or source is connected to GND; and at least one third diode connected in series in a forward direction from the cathode of said first diode toward the base or gate of said transistor.

According to the present invention, the number of elements that compose a protective circuit can be decreased, and the mounting area of the protective circuit that occupies the chip can be reduced.

Other and further objects, features and advantages of the invention will appear more fully from the following description.

DETAILED DESCRIPTION OF THE PREFERRED EMBODIMENTS

First Embodiment

Figure 1:
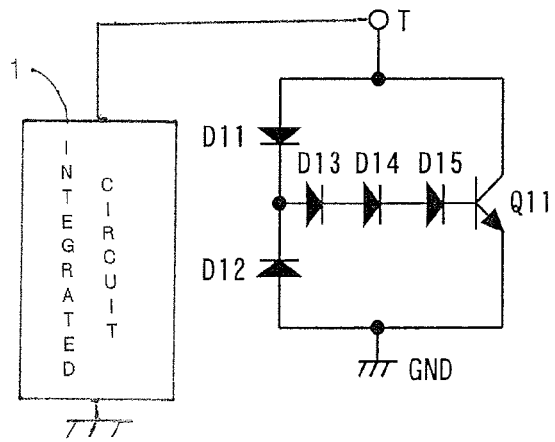
FIG. 1 is a circuit diagram showing a protective circuit according to the first embodiment.

FIG. 1 is a circuit diagram showing a protective circuit according to the first embodiment. The protective circuit is connected between a terminal T, which is a power source terminal or an input-output terminal of a semiconductor integrated circuit 1, and GND, to protect the semiconductor integrated circuit 1 from electrostatic discharge. The semiconductor integrated circuit 1 is, for example, a GaAs-HBT, and the base-emitter voltage or the base-collector voltage of this GaAs-HBT is about 1.2 V. Whereas, when a DC voltage of about 6 V or above is applied to the terminal T, the protective circuit is operated.

The anode of a diode D11 (first diode) is connected to the terminal T. The anode of a diode D12 (second diode) is connected to GND, and the cathode of the diode D12 is connected to the cathode of the diode D11. The collector of a transistor Q11 is connected to the terminal T, and the emitter of the transistor Q11 is connected to GND. Diodes D13 to D15 (third diodes) are connected in series in a forward direction from the cathodes of the diodes D11 and D12 toward the base of the transistor Q11.

Here, the portions between the base and the emitter and between the base and the collector of the transistor Q11 are equivalent to a diode, respectively. Therefore, in the portions in the forward direction and the backward direction from the terminal T toward GND, the above-described protective circuit is equivalent to five stages of diodes.

The operation of the protective circuit in the forward direction when a positive voltage is applied to the terminal T will be described. When a voltage of the clamp voltage determined by the five stages of diodes in the forward direction (6 V) or lower is applied to the terminal T, the transistor Q11 operates as a diode between the base and the emitter. On the other hand, when a voltage of the clamp voltage (6 V) or higher is applied to the terminal T, the transistor Q11 performs three-terminal operation. Therefore, the current flows mainly between the collector and the emitter of the transistor Q11 as a collector current.

The operation of the protective circuit in the backward direction when a negative voltage is applied to the terminal T will be described. Different from the operation in the forward direction, even if a voltage of the clamp voltage determined by the five stages of diodes in the backward direction (−6 V) or lower is applied to the terminal T, the transistor Q11 does not perform three-terminal operation. Therefore, the current flows through the diode D12, diodes D13 to D15, and between the base and the collector of the transistor Q11.

Figure 7:
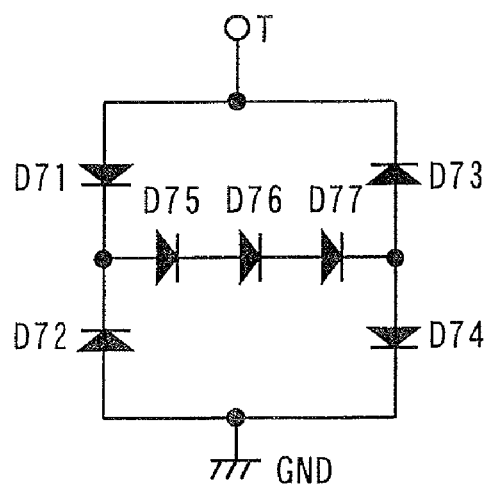
FIG. 7 is a circuit diagram showing a protective circuit, according to the second reference example.

The circuit according to the first embodiment is equivalent to the circuit shown in FIG. 7 wherein two diodes D73 and D74 are replaced by the transistor Q11. Therefore, compared with the circuit shown in FIG. 7, the mounting area can be reduced by the size of one element. The mounting area for the transistor is only larger than the area for a diode by the size of the electrodes. Since only the base current of the transistor Q11 flows in the diode D11, the area for p-n junction of the diode D11 can be made smaller than the area of the transistor Q11. Therefore, the number of elements composing the protective circuit can be reduced to make the mounting area of the protective circuit on the chip smaller.

In the first embodiment, although there are three diodes between the cathodes of the diodes D11 and D12, and the base of the transistor Q11, the present invention is not limited thereto, but at least one is sufficient. By increasing or decreasing the number of diodes, the number of stages in the protective circuit can be adjusted. For example, when the number of the diode is one, the number of the stages in the protective circuit is three.

Second Embodiment

Figure 2:
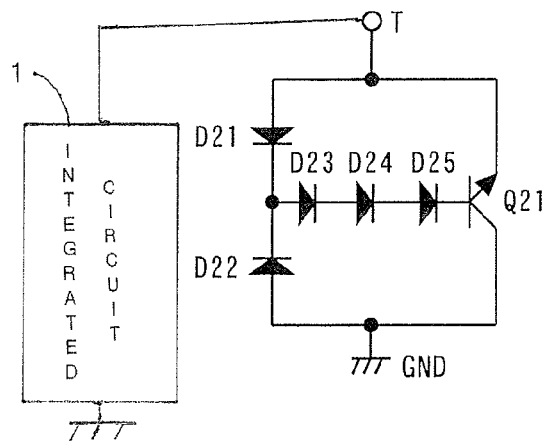
FIG. 2 is a circuit diagram showing a protective circuit according to the second embodiment.

FIG. 2 is a circuit diagram showing a protective circuit according to the second embodiment. This protective circuit is a circuit wherein the terminal T and GND are replaced by each other in the circuit according to the first embodiment. Therefore, the operation of the protective circuit is opposite to the operation of the circuit according to the first embodiment in terms of the forward direction and the backward direction.

The anode of a diode D21 (first diode) is connected to the terminal T. The anode of a diode D22 (second diode) is connected to GND, and the cathode of the diode D22 is connected to the cathode of the diode D21. The emitter of a transistor Q21 is connected to the terminal T, and the collector of the transistor Q21 is connected to GND. Diodes D23 to D25 (third diodes) are connected in series in a forward direction from the cathodes of the diodes D21 and D22 toward the base of the transistor Q21.

Third Embodiment

Figure 3:
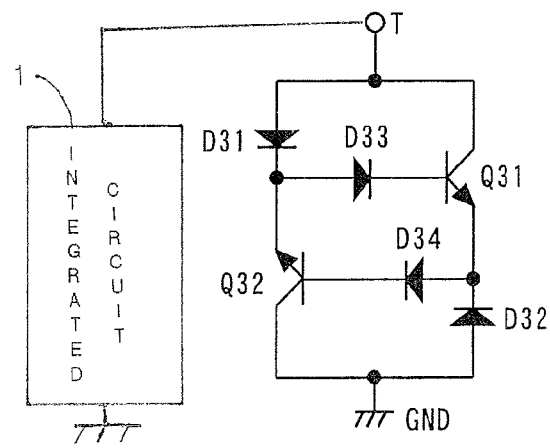
FIG. 3 is a circuit diagram showing a protective circuit according to the third embodiment.

FIG. 3 is a circuit diagram showing a protective circuit according to the third embodiment. This protective circuit is connected between the terminal T, which is the power source terminal or the input-output terminal and GND, and protects the semiconductor integrated circuit 1 from electrostatic discharge. The semiconductor integrated circuit 1 is, for example, a GaAs-HBT, and the base-emitter voltage or the base-collector voltage of the GaAs-HBT is about 1.2 V. Whereas, when a DC voltage of about 6 V or higher is applied to the terminal T, the protective circuit operates.

The anode of a diode D31 (first diode) is connected to the terminal T. The anode of a diode D32 (second diode) is connected to GND. The collector of a transistor Q31 (first transistor) is connected to the terminal T, and the emitter thereof is connected to the cathode of the diode D32. The collector of a transistor Q32 (second transistor) is connected to GND, and the emitter thereof is connected to the cathode of the diode D31. The anode of a diode D33 (third diode) is connected to the cathode of the diode D31, and the cathode of the diode D33 is connected to the base of the transistor Q31. The anode of a diode D34 (fourth diode) is connected to the cathode of the diode D32, and the cathode of the diode D34 is connected to the base of the transistor Q32.

Here, the portions between the base and the emitter of the transistor Q31 and between the base and the collector of the transistor Q32 are equivalent to a diode, respectively. Therefore, in the portion in the forward direction from the terminal T toward GND, the above-described protective circuit is equivalent to five stages of diodes. The portion in the backward direction is also the same.

The operation of the protective circuit in the forward direction when a positive voltage is applied to the terminal T will be described. When a voltage of the clamp voltage determined by the five stages of diodes in the forward direction (6 V) or lower is applied to the terminal T, the transistor Q31 operates as a diode between the base and the emitter. On the other hand, when a voltage of the clamp voltage (6 V) or higher is applied to the terminal T, the transistor Q31 performs three-terminal operation. Therefore, the current flows mainly between the collector and the emitter of the transistor Q31 as a collector current, and further flows through the diode D34 and between the base and the collector of the transistor Q32 to GND.

Since the protective circuit according to the third embodiment is symmetric between the terminal T and GND, the protective circuit operates in the same way when a negative voltage is applied to the terminal T as when a positive voltage is applied to the terminal T.

Since the circuit according to the third embodiment has six elements, the number of elements can be reduced compared with the circuit shown in FIG. 7. The mounting area for the transistor is only larger than the area for a diode by the size of the electrodes. Since only the base current of the transistor Q31 flows in the diode D31, the area for p-n junction of the diode D31 can be made smaller than the area of the transistor Q31. Therefore, the number of elements composing the protective circuit can be reduced to make the mounting area of the protective circuit on the chip smaller.

Fourth Embodiment

Figure 4:
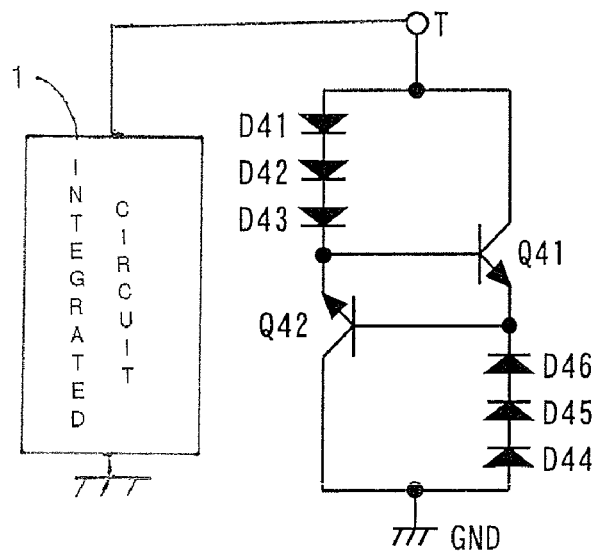
FIG. 4 is a circuit diagram showing a protective circuit according to the fourth embodiment.

FIG. 4 is a circuit diagram showing a protective circuit according to the fourth embodiment. This protective circuit is connected between the terminal T, which is the power source terminal or the input-output terminal and GND, and protects the semiconductor integrated circuit 1 from electrostatic discharge. The semiconductor integrated circuit is, for example, a GaAs-HBT, and the base-emitter voltage or the base-collector voltage of the GaAs-HBT is about 1.2 V. Whereas, when a DC voltage of about 6 V or higher is applied to the terminal T, the protective circuit operates.

The collector of a transistor Q41 (first transistor) is connected to the terminal T. The base of a transistor Q42 (second transistor) is connected to the emitter of the transistor Q41, the collector thereof is connected to GND, and the emitter thereof is connected to the base of the transistor Q41. Diodes D41 to D43 (first diodes) are connected in series in a forward direction from the terminal T toward the base of the transistor Q41. Diodes D44 to D46 (second diodes) are connected in series in a forward direction from GND toward the base of the transistor Q42.

Here, the portions between the base and the emitter of the transistor Q41 and between the base and the collector of the transistor Q42 are equivalent to a diode, respectively. Therefore, in the portion in the forward direction from the terminal T toward GND, the above-described protective circuit is equivalent to five stages of diodes. The portion in the backward direction is also the same.

The operation of the protective circuit in the forward direction when a positive voltage is applied to the terminal T will be described. When a voltage of the clamp voltage determined by the five stages of diodes in the forward direction (6 V) or lower is applied to the terminal T, the transistor Q41 operates as a diode between the base and the emitter. On the other hand, when a voltage of the clamp voltage (6 V) or higher is applied to the terminal T, the transistor Q41 performs three-terminal operation. Therefore, the current flows mainly between the collector and the emitter of the transistor Q41 as a collector current, and further flows between the base and the collector of the transistor Q42 to GND.

Since the protective circuit according to the fourth embodiment is symmetric between the terminal T and GND, the protective circuit operates in the same way when a negative voltage is applied to the terminal T as when a positive voltage is applied to the terminal T.

Figure 6:
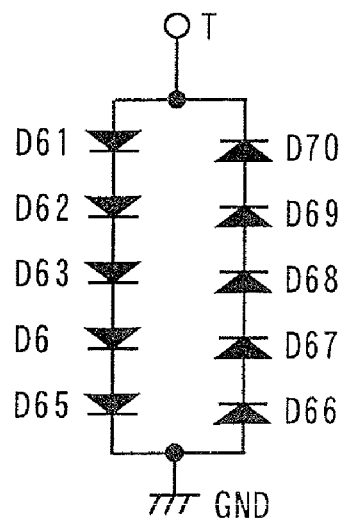
FIG. 6 is a circuit diagram showing a protective circuit, according to the first reference example.

Since the circuit according to the fourth embodiment has eight elements, the number of elements can be reduced compared with the circuit shown in FIG. 6. The mounting area for the transistor is only larger than the area for a diode by the size of the electrodes. Since only the base current of the transistors Q41 and Q42 flows in the diodes D41 to D46, the area for p-n junction of the diodes D41 to D46 can be made smaller than the area of the transistors Q41 and Q42. Therefore, the number of elements composing the protective circuit can be reduced to make the mounting area of the protective circuit on the chip smaller.

In the fourth embodiment, although three diodes, D41 to D43, are used as the first diodes, the present invention is not limited thereto, but at least one diode is sufficient. Although three diodes, D44 to D46, are used as the second diodes, the present invention is not limited thereto, but at least one diode is sufficient. By increasing or decreasing the number of these diodes, the number of stages of the protective circuit can be adjusted.

Fifth Embodiment

Figure 5:
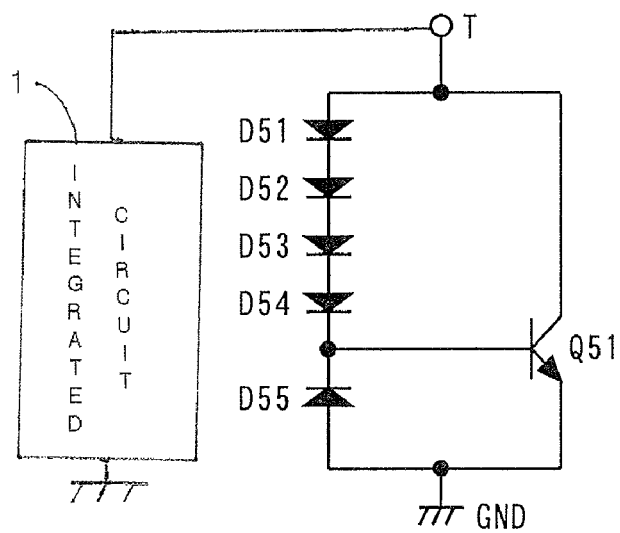
FIG. 5 is a circuit diagram showing a protective circuit according to the fifth embodiment.

FIG. 5 is a circuit diagram showing a protective circuit according to the fifth embodiment. This protective circuit is connected between the terminal T, which is the power source terminal or the input-output terminal and GND, and protects the semiconductor integrated circuit 1 from electrostatic discharge. The semiconductor integrated circuit 1 is, for example, a GaAs-HBT, and the base-emitter voltage or the base-collector voltage of the GaAs-HBT is about 1.2 V. Whereas, when a DC voltage of about 6 V or higher is applied to the terminal T, the protective circuit operates.

The collector of a transistor Q51 is connected to the terminal T, and the emitter thereof is connected to GND. Diodes D51 to D54 (first diodes) are connected in series in a forward direction from the terminal T toward the base of the transistor Q51. A diode D55 (second diode) is connected in a forward direction from GND toward the base of the transistor Q51.

Here, the portions between the base and the emitter and between the base and the collector of the transistor Q51 are equivalent to a diode, respectively. Therefore, in the portions in the forward direction from the terminal T toward GND, the above-described protective circuit is equivalent to five stages of diodes, and in the backward direction, the protective circuit is equivalent to two stages of diodes.

The operation of the protective circuit in the forward direction when a positive voltage is applied to the terminal T will be described. When a voltage of the clamp voltage determined by the five stages of diodes in the forward direction (6 V) or lower is applied to the terminal T, the transistor Q51 operates as a diode between the base and the emitter. On the other hand, when a voltage of the clamp voltage (6 V) or higher is applied to the terminal T, the transistor Q51 performs three-terminal operation. Therefore, the current flows mainly through between the collector and the emitter of the transistor Q51 as a collector current.

The operation of the protective circuit in the backward direction when a negative voltage is applied to the terminal T will be described. Different from the operation in the forward direction, even if a voltage of the clamp voltage determined by the two stages of diodes in the backward direction (−2.4 V) or lower is applied to the terminal T, the transistor Q51 does not perform three-terminal operation. Therefore, the current flows through the diode D55, and between the base and the collector of the transistor Q51.

Since the circuit according to the fifth embodiment has six elements, the number of elements can be reduced compared with the circuit shown in FIG. 7. The mounting area for the transistor is only larger than the area for a diode by the size of the electrodes. Since only the base current of the transistor Q51 flows in the diodes D51 to D54, the area for p-n junction of the diodes D51 to D54 can be made smaller than the area of the transistors Q51. Therefore, the number of elements composing the protective circuit can be reduced to make the mounting area of the protective circuit on the chip smaller.

In the fifth embodiment, although four diodes, D51 to D54, are used as the first diodes, the present invention is not limited thereto, but at least one diode is sufficient. Although one diode D55 is used as the second diode, the present invention is not limited thereto, but at least one diode is sufficient. By increasing or decreasing the number of these diodes, the number of stages of the protective circuit can be adjusted. Although the minimum number of stages of the protective circuits according to the first to fourth embodiments is three, the minimum number of stages of the protective circuits according to the fifth embodiment is two in both forward and backward directions.

In the above-described first to fifth embodiments, although bipolar transistors are used as transistors Q11, Q21, Q31, Q32, Q41, Q42 and Q51, the present invention is not limited thereto, but n-channel FETs of an enhancement mode may also be used. In this case, the bases, collectors and emitters of the transistors Q11, Q21, Q31, Q32, Q41, Q42 and Q51 are gates, drains and sources, respectively.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-023884, filed on Feb. 4, 2008 including specification, claims, drawings and summary, on which the Convention priority of the present application is based, are incorporated herein by reference in its entirety.

What is claimed is:

1. A semiconductor circuit comprising:
   a semiconductor integrated circuit including a terminal; and
   a protective circuit connected between the terminal of the semiconductor integrated circuit and ground (GND), wherein the protective circuit includes
      a first diode having an anode and a cathode, with the anode connected to the terminal of the semiconductor integrated circuit,
      a second diode having an anode connected to the GND and a cathode connected to the cathode of the first diode, and
      a transistor having a first terminal connected to the terminal of the semiconductor integrated circuit, a second terminal connected to the GND, and a control terminal connected to the cathode of the first diode, wherein the cathode of the first diode is connected only to the control terminal of the transistor and to the cathode of the second diode.

2. The semiconductor circuit according to claim 1, wherein the first diode comprises a plurality of diodes connected in like-polarity series.

3. A semiconductor circuit comprising:
   a semiconductor integrated circuit including a terminal; and
   a protective circuit connected between the terminal of the semiconductor integrated circuit and ground (GND), wherein the protective circuit includes
      a first diode having an anode and a cathode, with the anode connected to the terminal of the semiconductor integrated circuit,
      a second diode having an anode connected to the GND and a cathode connected to the cathode of the first diode, and
      a transistor having a first terminal connected to the terminal of the semiconductor integrated circuit, a second terminal connected to the GND, and a control terminal, and
      at least one third diode connected in series from the cathode of the first diode to the control terminal of the transistor, wherein the cathode of the first diode is connected only to the third diode and the cathode of the second diode.

4. A semiconductor circuit comprising:
   a semiconductor integrated circuit including a terminal; and
   a protective circuit connected between the terminal of the semiconductor integrated circuit and ground (GND), wherein the protective circuit includes
      a first diode having an anode and a cathode, with the anode connected to the terminal of the semiconductor integrated circuit,
      a second diode having an anode connected to the GND and a cathode connected to the cathode of the first diode, and
      a transistor having a first terminal connected to the terminal of the semiconductor integrated circuit, a second terminal connected to the GND, and a control terminal connected to the cathode of the first diode, wherein
         the anode of the first diode is directly connected to the terminal of the semiconductor integrated circuit, and
         the anode of the second diode is directly connected to the GND.

5. The semiconductor circuit according to claim 4, wherein the protective circuit further includes at least one third diode connected in series from the cathode of the first diode to the control terminal of the transistor.

6. The semiconductor circuit according to claim 4, wherein the first diode comprises a plurality of diodes connected in like-polarity series.

* * * * *